United States Patent [19]
Hausinger

[11] 3,744,607
[45] July 10, 1973

[54] DISENGAGING BEARING FOR CLUTCHES

[75] Inventor: Otto Hausinger, Gerlingen, Germany

[73] Assignee: Dr.-Ing h. c. F. Porsche KG,
Stuttgart-Zuffenhausen, Germany

[22] Filed: June 22, 1971

[21] Appl. No.: 155,491

[30] Foreign Application Priority Data
June 26, 1970 Germany.................. P 20 31 582.6

[52] U.S. Cl. ............................................... 192/98
[51] Int. Cl. ........................................... F16d 23/14
[58] Field of Search.................. 192/98, 110 B, 99 S

[56] References Cited
UNITED STATES PATENTS
1,431,552  10/1922  White............................. 192/110 B
1,880,344  10/1904  Franco............................. 192/99 S
2,228,016  1/1941   Pearson........................... 192/110 B
3,286,802  11/1966  Fadler et al....................... 192/98
3,357,529  11/1967  Binder et al....................... 192/98

Primary Examiner—Benjamin W. Wyche
Attorney—Craig, Antonelli & Hill

[57] ABSTRACT

A release bearing for clutches, especially for friction clutches of motor vehicles, in which a housing equipped with a roller bearing and actuated by means of a release member is so constructed that during the disengagement of the clutch, the release member engages in the housing and comes into abutment directly on a race of the roller bearing.

15 Claims, 3 Drawing Figures

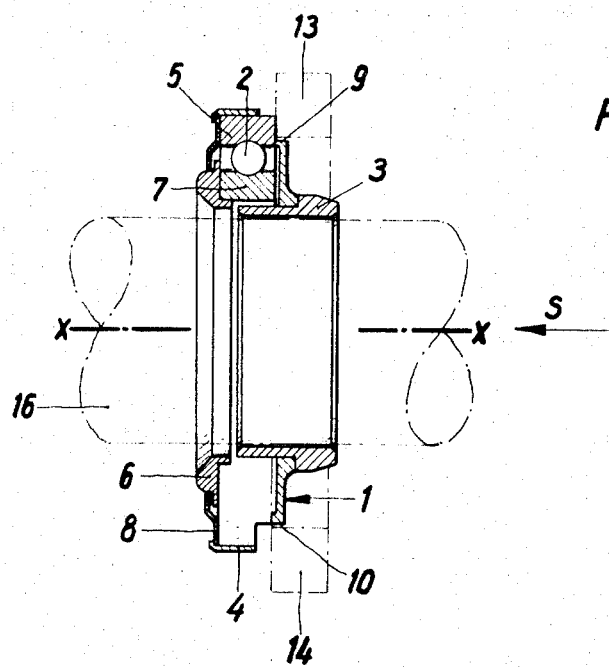
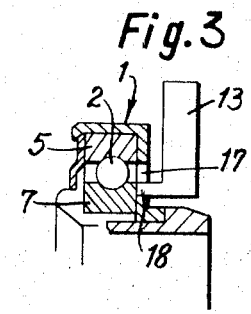
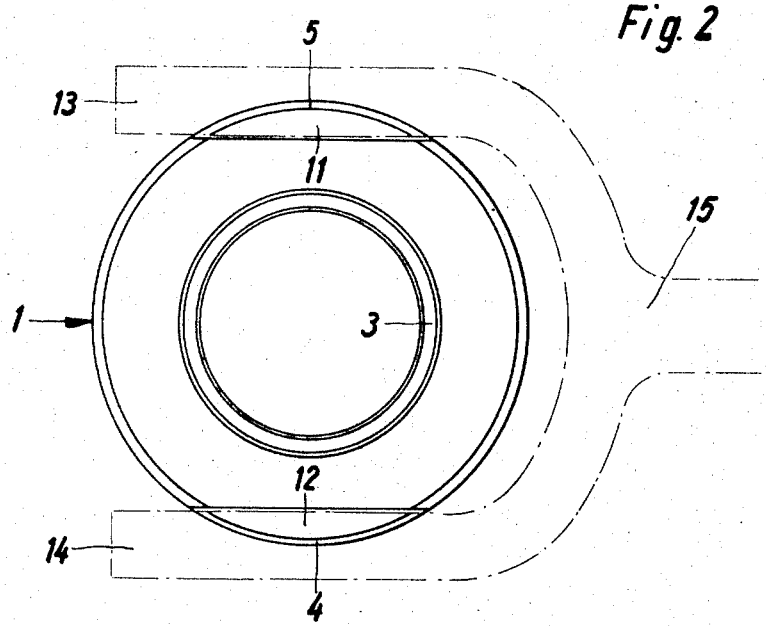

DISENGAGING BEARING FOR CLUTCHES

The present invention relates to a release bearing for clutches, especially for friction clutches of motor vehicles, consisting of a housing with inserted roller bearing and actuated by means of a disengaging element.

Release bearings of this type serve as shifting element which during the clutch disengagement separates a driving part from a driven part of a disengageable clutch.

It is known to provide the housing of the release bearing with pins which cooperate during the disengagement of the clutch with pivot levers (German Pat. No. 834,178). A further known release bearing utilizes a shifting sleeve in lieu of the pins (U.S. Pat. No. 2,235,431). The constructions according to both of these prior art patents are costly both as to space requirement as also with respect to the manufacture.

In contradistinction thereto, the present invention is concerned with the task to provide a release bearing which is simple in construction and requires little space.

The underlying problem is solved according to the present invention in that during the disengagement of the clutch the disengaging element engages in the housing and comes into abutment directly on a race of the roller bearing. It is particularly appropriate if the release housing is provided within the area of its outer circumference at the side facing the the disengaging element with two openings which are disposed symmetrically to the axis of rotation of the roller bearing and expose two surfaces of circular segmental shape of the outer race of the roller bearing. According to a further feature of the present invention, the release bearing consists of a release housing which includes a bearing housing and a guide tube and into which are inserted the outer race and a cover ring of a grooved ball bearing, as well as of a thrust ring retained by the inner race of the grooved ball bearing.

The advantages attainable with the present invention reside especially in that a release bearing is produced whose release housing is relieved from the disengaging forces. By the use of a ring or race of the roller bearing as abutment for the shifting fork, both a separate reinforcement or a hardening of the release housing as also the provision of a separate structural part are dispensed with. Furthermore, the space requirement is reduced and materials are economized by the compact type of construction according to the present invention. The interchangeability of the inserted roller bearing is facilitated and leads to a decrease of servicing and repair expenditures.

These and further objects, features and advantages of the present invention will become more apparent from the following description when taken in connection with the accompanying drawing which shows, for purposes of illustration only, one embodiment in accordance with the present invention, and wherein:

FIG. 1 is a longitudinal cross-sectional view through a release bearing according to the present invention, omitting one symmetrical half of the inserted roller bearing;

FIG. 2 is an elevational view of the release bearing according to the present invention as shown in FIG. 1, taken in the direction of arrow S; and FIG. 3 is a partial schematic longitudinal cross-sectional view through a portion of a modified release bearing, as compared to FIG. 1, according to the present invention.

Referring now to the drawing wherein like reference numerals are used throughout the views to designate like parts, the release bearing consists of the release housing generally designated by reference numeral 1 and of the inserted grooved roller bearing 2. The release housing 1 is constituted by a guide tube 3 and a bearing housing 4 which are connected with each other by means of soldering or brazing under protective gas. The grooved roller bearing 2 is fitted between the guide tube 3 and the bearing housing 4, whose outer race 5 is securely seated in the bearing housing 4. Opposite the bearing housing 4 extends a thrust ring 6 which is securely seated in the inner race 7 of the grooved ball bearing 2. A cover ring 8 which serves for purposes of providing a seal between the bearing housing 4 and the thrust ring 6, is retained in the bearing housing 4 by being rolling-in. The bearing housing 4 is provided within the area of the outer race 5 of the grooved ball bearing 2 with two openings or cuts 9 and 10 so that two surfaces 11, 12 of circular segmental shape of the outer race 5 become visible.

During the disengagement of the clutch (not shown), the form arms 13, 14 of a release fork 15 indicated in dash and dot lines come into abutment against the surfaces 11, 12 of the outer race 5 and displace the release bearing on a shaft 16 also shown in dash and dot lines. FIG. 3 shows a modified form of the release bearing according to the present invention wherein the fork arm 13 of the release fork engages with the inner race 7 of the bearing rather than with the outer race 5 as in the FIG. 1 embodiment. An opening 17 in the housing as well as a projection 18 of the fork arm 13 are schematically shown for accommodating the direct engagement of the fork arm 13 at the inner race 7.

While I have shown and described only two embodiment in accordance with the present invention, it is understood that the same is not limited thereto but is susceptible of numerous changes and modifications as known to those skilled in the art. Thus, it is also within the scope of the present invention, for example, to utilize roller bearings of other types and openings of other shapes exposing, for instance, the inner race. Furthermore, the bearing housing and guide tube may be combined into a release housing made of a single, unitary part. Thus, it is obvious that the present invention is susceptible of numerous changes and modifications without departing from the spirit and scope thereof and I therefore intend to cover all such changes and modifications as are encompassed by the scope of the appended claims.

What is claimed:

1. A release bearing for clutches, especially for friction clutches of motor vehicles, which includes a housing means with inserted roller bearing means and actuated by a disengaging member, characterized in that during the disengagement of the clutch, the disengaging member engages into the housing means and comes into abutment directly on a race of the roller bearing means, and in that the release housing means is provided at the side thereof facing the disengaging member with two openings that are disposed substantially symmetrical to the axis of rotation of the roller bearing means and which expose two surfaces of a race of the roller bearing means.

2. A release bearing according to claim 1, characterized in that the openings are within the area of the outer circumference of the release housing means and in that said surfaces are of substantially circular segmental shape.

3. A release bearing according to claim 1, characterized in that said race is the outer race of the roller bearing means.

4. A release bearing according to claim 1, characterized in that said race is the inner race of said roller bearing means.

5. A release bearing according to claim 1, characterized in that the release bearing essentially consists of a release housing means which includes a bearing housing and a guide tube, and in that an outer race and a cover ring of the roller bearing means is inserted into the bearing housing means, as well as of a thrust ring retained by the inner race of the roller bearing means.

6. A release bearing according to claim 5, characterized in that the roller bearing means is a grooved ball bearing.

7. A release bearing according to claim 6, characterized in that said race is the outer race of the roller bearing means.

8. A release bearing according to claim 6, characterized in that said race is the inner race of said roller bearing means.

9. A release bearing according to claim 6, characterized in that the openings are within the area of the outer circumference of the release housing means and in that said surfaces are of substantially circular segmental shape.

10. A release bearing arrangement for clutches, especially for friction clutches of motor vehicles and the like; said arrangement comprising:
   release housing means,
   roller bearing means having inner and outer bearing races mounted within said release housing means,
   and a clutch disengaging member for applying clutch disengaging forces to said release housing means and roller bearing means,
   wherein said release housing means is provided at the side thereof which faces the disengaging member with at least one housing opening which exposes a surface portion of one of said bearing races, said release housing means having portions covering parts of both of said inner and outer races which face in the direction of the disengaging member, and wherein a portion of said disengaging member extends through said housing opening and abuttingly engages said surface portion during disengagement of the clutch, whereby clutch disengaging forces are transmitted directly from said disengaging member to said one of said bearing races.

11. An arrangement according to claim 10, wherein a plurality of housing openings are provided for accommodating abutting engagement of said disengaging member at a corresponding plurality of surface portions of said one of said bearing races, and wherein said housing openings are disposed substantially symmetrical to the axis of rotation of the roller bearing means.

12. An arrangement according to claim 11, wherein said plurality of housing openings consists of two housing openings.

13. An arrangement according to claim 10, wherein said one of said bearing races is the inner bearing race.

14. An arrangement according to claim 10, wherein said one of said bearing races is the outer bearing race.

15. An arrangement according to claim 10, wherein said at least one housing opening is within the area of the outer circumference of the release housing means, and wherein said surface portion is of substantially circular segmental shape.

* * * * *